May 9, 1933.                J. C. WILSON                1,908,394
                         ART OF BLANCHING CELERY
                          Filed Dec. 21, 1931

INVENTOR.
Joseph C. Wilson
BY
Allen & Allen
ATTORNEYS.

Patented May 9, 1933

1,908,394

UNITED STATES PATENT OFFICE

JOSEPH C. WILSON, OF MIDDLETOWN, OHIO, ASSIGNOR TO THE CRYSTAL TISSUE COMPANY, OF MIDDLETOWN, OHIO, A CORPORATION OF OHIO

ART OF BLANCHING CELERY

Application filed December 21, 1931. Serial No. 582,250.

My invention relates to the art of blanching celery, in which a novel blanching device is provided which may be applied to the celery plants in an improved manner, and in which improved results may be obtained.

In order to understand the improvements which I contemplate in the art of blanching celery, it is thought that reference to previous known methods of performing this agricultural operation should be had. W. R. Beattie, Horticulturist, in the United States Department of Agriculture Farmers' Bulletin No. 1269, has described known methods of blanching celery.

It is the object of my invention to provide a blanching device which may be easily and quickly applied to the celery stalk, and which, after its application, will be uniform in blanching results.

Another object of my invention is to provide a blanching device which will be flexible to avoid injury to the plant, and which will be odorless to avoid tainting the natural flavor of the celery stalks.

Another object of my invention is to provide a blanching device which will be waterproof so as to withstand rain and hose drenching, and which will further be heat-proof to withstand the withering effect of the summer heat and sun's rays.

A further object of my invention is to provide a blanching device which will be light-proof to the actinic light rays of the sun, so that maximum blanching effect will be secured.

It is further an object of my invention to provide a tubular blanching device preferably capable of being telescoped or nested, which may be carried on the forearm of the celery worker and applied to the celery plant with a minimum of labor and time.

It is a further object of my invention to provide a blanching medium which may be applied to celery plants by unskilled laborers, and in which the speed of application is such that the operation of applying the blanching devices becomes an inconsequential operation instead of one of the most tedious and expensive processes in connection with the growing of this vegetable.

The above objects and other objects in connection with the manner of applying the blanching device to the celery plant, to which reference will be made in the ensuing disclosure, I accomplish in accordance with the following description.

Referring to the drawing.

Figure 1:
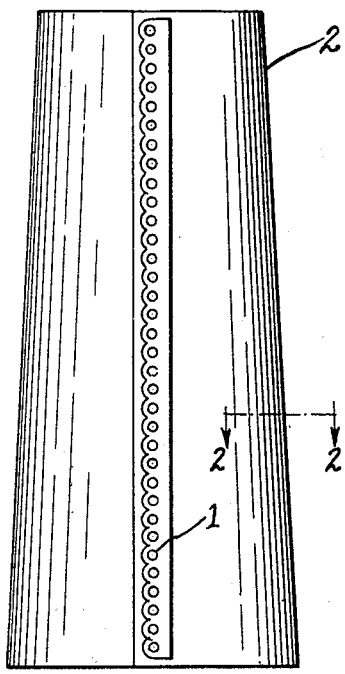
Figure 1 is a side elevation of a preferred type of blanching device.
Figure 2:
Figure 2 is a section along the line 2—2 of Figure 1.

Referring first to Figure 1, I have shown a sheet of paper shaped into tubular form with lapped ends thereof joined together by means of fasteners 1. The particular device illustrated is composed of an outer sheet 2 of suitable paper, preferably colored red, and with an inner sheet 3, preferably colored black, with the two layers secured together by means of a film of paraffin, and with paraffin coated over the outside and inside surface of the tube. The shape of the tube illustrated is frusto-conical, which is the desired shape for the device which I purpose to use in connection with my new art.

Figure 3:
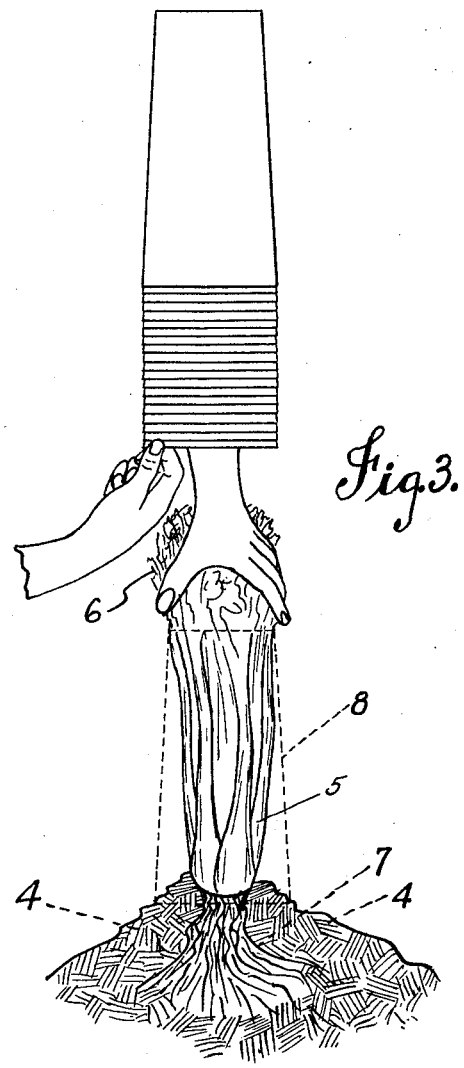
Figure 3 is a diagrammatic sectional view of a celery row showing the preferred manner of application of the blanching device to a celery plant.

In Figure 3 I have illustrated the preferred method of applying the blanching devices to the celery plants. At 4 I have illustrated the furrow which is usually sloped up to a peak from which the celery plant 5 grows, the foliage of the celery plant being indicated at 6. The roots of the plant are indicated at 7. It will be understood that a row of celery comprises a series of duplicate units, all of which are handled in a similar manner in applying the blanching devices thereto.

The operator places a telescoped or nested series of the tubes upon his left forearm and extends his hand down through the tubes so that he may grasp the foliage of the celery and draw it together in a bunched formation. With the right hand the operator then withdraws one of the tubes and pulls it down over his hand over the bunched foliage of the plant, to the position indicated at 8, with the lower rim of the tube seating within the soft dirt surrounding the plant at the top of the furrow.

While I have illustrated a conical type of blanching device, this is only the preferred form, and it will be obvious that the tube may be composed of other materials than a two-ply layer of paper. It is one of the features of my invention, however, that the material, if it be thin enough to be translucent, have such coloring as to preclude the passage therethrough of actinic rays which develop the chlorophyll and consequently induce the green coloring of the stalk which it is the object of the blanching operation to prevent.

In my method of blanching celery it will thus be observed that I have provided blanching tubes which may easily and quickly applied, which will be flexible to prevent injury to the plant, and which will be odorless, waterproof, light-proof, and heat-proof. It will further be observed that in the manner of applying the blanching tubes to the celery plants, my preferred method of operation enables the work to be quickly and readily done.

The defect of wrapping the stalks with paper which ordinarily cannot be used again will be overcome. It will not be necessary to incur the heavy expense for lumber or tile, and the use of a machine for laying out bands of paper is not required.

Further, I have provided a device which, because of its seating within the soft earth surrounding the plant, tends to prevent the dissipation of moisture which flows down the plant stalk from the leaves when the crop is sprinkled either by natural rain or by artificial sprinkling.

Having thus described my invention, what I claim as new and desire to secure by Letters Patent, is:—

1. The art of blanching celery which consists in manually grasping the foliage of a celery plant through a tubular shield and then while holding said foliage in bunched condition, moving the shield so as to enclose the stalks of the celery plant leaving the foliage exposed.

2. The art of blanching celery which consists in retaining a group of nested flexible tubular shields on the forearm and then extending the hand through the shields, grasping the foliage of a celery plant and bunching it, and finally moving down one of the shields so as to surround the stalks of the plant, leaving the leaves exposed.

3. A celery blanching shield comprising a flexible tubular paper shield composed of an inner sheet of black color and an outer sheet of red color, said sheets being joined together with a layer of paraffine, and the whole shield covered inside and out with paraffine.

4. A celery blanching shield comprising a frusto-conical shield composed of an inner sheet of paper and an outer sheet of paper, said sheets being joined together with a layer of paraffine and a layer of paraffine coating both sides of said sheets, said sheets being rolled into the resulting frusto-conical shape, and said shield being impervious to the actinic rays of light.

5. A celery blanching shield comprising a frusto-conical shield composed of three layers of paraffine and two layers of paper, said paper layers being positioned between the layers of paraffine so that they are covered on both sides by a layer of paraffine and said shield being impervious to actinic rays of light.

6. A frusto-conical celery blanching shield composed of a plurality of paper sheets joined together by a layer of paraffine and coated on the inner side and the outer side with a layer of paraffine, said sheets being impervious to actinic light rays, and rolled into said frusto-conical shape, and means for holding them in aforesaid shape.

7. A material for making celery blanching shields, comprising two sheets of paper joined together by a layer of paraffine and coated on both sides with paraffine, one of said sheets being black in color and the other of said sheets being red in color, so as to be impervious to the actinic rays of light.

8. A frusto-conical celery blanching shield comprising an inner and outer layer of paraffine and two sheets of paper between said layers of paraffine and separated from each other by a layer of paraffine, said sheets being of such a color that they are impervious to the actinic rays of light.

9. A frusto-conical celery blanching shield comprising an inner and outer layer of paraffine and two sheets of paper between said layers of paraffine and separated from each other by a layer of paraffine, one of said sheets being black and the other of said sheets being red so as to be impervious to the actinic rays of light, said sheets being of such a color that they are impervious to the actinic rays of light.

10. A celery blanching shield comprising a frusto-conical tubular paper shield adapted to be nested and of such size that the shields when nested may be placed over the arm of an operator and retained thereon for dispensing.

11. A plurality of nested frusto-conical tubular paper celery blanching shields of such size that they may be nested and slipped over the arm of an operator and retained thereon for dispensing.

12. A celery blanching shield comprising a frusto-conical tubular paper shield composed of two layers of paper joined together by a layer of paraffine and coated with paraffine, and of such color as to be impervious to the actinic rays of light, and of such size as to admit the arm of an operator so that said shield may be retained thereon for positioning about a stalk of celery.

JOSEPH C. WILSON.